United States Patent [19]

Klaveness

[11] 4,207,619
[45] Jun. 10, 1980

[54] SEISMIC WELL LOGGING SYSTEM AND METHOD

[76] Inventor: Alf Klaveness, 12634 Taylorcrest, Houston, Tex. 77024

[21] Appl. No.: 552,250

[22] Filed: Feb. 24, 1975

[51] Int. Cl.² ............................ G01V 1/20; G01V 1/28
[52] U.S. Cl. .......................................... 367/36; 367/56; 367/59; 367/68; 367/81; 181/106
[58] Field of Search .................. 340/155 CP, 155 MC, 340/18 LD; 181/106

[56] References Cited

U.S. PATENT DOCUMENTS

| 2,933,144 | 4/1960 | Scott et al. | 340/18 LD |
| 3,817,345 | 6/1974 | Bailey | 340/15.5 MC |
| 3,845,837 | 11/1974 | McEvers, Jr. et al. | 181/106 |

OTHER PUBLICATIONS

"An Approximate Correction Method for Refraction in Reflection Seismic Prospecting," Krey, *Geophysics*, vol. 16, No. 3, Jul. 1951, pp. 468–485.

*Primary Examiner*—Howard A. Birmiel
*Attorney, Agent, or Firm*—Bill B. Berryhill

[57] ABSTRACT

Disclosed is a seismic data gathering system for use in well drilling operations. A seismic pulse generator may be placed in the drill string near the drill bit and advanced in the well for generation of seismic pulses at any depth. An array of seismometers, rotationally symmetric about the well, may be arranged at the surface to detect both pulses refracted above the seismic pulse generator and pulses reflected at interfaces below the generator. According to the method of the invention, the refracted and reflected seismic pulse data may be reduced and analyzed to determine the drilling direction of the drill bit, the lithology through which the drill is passing, the position and approximate shape of nearby oil or gas reservoirs otherwise missed, and to look ahead of the drill bit to determine geologic conditions in advance of the drilling.

20 Claims, 6 Drawing Figures

SEISMIC WELL LOGGING SYSTEM AND METHOD

BACKGROUND OF THE INVENTION

1. Field of the Invention

The present invention pertains generally to methods and systems for obtaining geological information for application in well drilling. More particularly, the invention pertains to a method and system for continuously obtaining seismic reflection and refraction data, and utilizing the data to determine lithologic changes near the level of the drill bit, to monitor the progress of the drill bit, and to look ahead of the drill bit without significantly interfering with the drilling process.

2. Brief Description of the Prior Art

The use of sonic waves to determine the geological structure of a subterranean region is well known. In a typical application, sonic wave detectors, or seismometers, are arranged on the surface above the region to be explored. A sonic wave source, also located on or near the surface, is triggered to emit one or a series of sonic pulses. The pulses propogate in a generally spherical pattern into the ground, and are reflected at interfaces between various structures wherein the propogation characteristics of sonic waves differ. The reflected pulses travel toward the surface where they are sensed and recorded by the detectors. The resulting data are then corrected for geometric aberrations and displayed for analysis and interpretation.

This method is useful in obtaining cross-sectional mapping of the subterranean geological structure based on the sonic wave reflectances of those structural details. In the end, the accuracy and reliability of such mapping depends not only on the data gathering technique, but on the interpretive skills of the data evaluator. Usually, the mapping cannot be verified until core samples, drill cuttings, or logging data are obtained and analyzed. Although such seismic mappings are in wide use in determining where to drill for hydrocarbons, for example, information based solely on reflections of pulses generated at the surface can only be considered as of a preliminary nature for the drilling operation itself.

The method in U.S. Pat. No. 2,062,151 uses the action of the bit in either a cable tool or a rotary drilling operation to generate seismic waves which are detected by a plurality of wave detectors at the surface. The travel times of the waves to the detectors are determined and used to measure the deviation of the well hole from the vertical. Well hole deviation and the velocity of seismic waves appear to be the only types of information for which that patented method was intended. A similar method for detecting well hole deviation is shown in U.S. Pat. No. 3,817,345, wherein the seismic waves are generated by raising then dropping the drill bit.

Various well logging techniques are also well known and in widespread use to examine a well bore after it has been drilled. However, the subterranean region which can be studied by logging generally extends only a few feet from the well bore itself. (An exception to this restriction can be found in U.S. Pat. No. 3,690,164 which uses electrical or acoustical signals.) Furthermore, since logging requires a hole in which to lower the logging equipment, information from logging can be obtained only after a well bore has been drilled, and is unavailable in determining what lies ahead of the drill bit as a well is being drilled. Finally, in those cases where drilling is interrupted to log the well, the drilling string is removed, the well logged, and the drilling string replaced in the well to continue drilling. Such a round trip can require up to a day to complete, resulting in an expensive delay in drilling. As a result, when a well is logged, the operation is usually not performed more frequently than once for approximately every five thousand feet drilled.

Drill cuttings that surface with the cycling drilling mud are often examined to determine the type of material through which the drill bit has passed. But, once the well bore has been drilled to a substantial depth, it may take hours for drill cuttings to surface. By that time, the drill bit may have advanced a considerable distance beyond where the drill cuttings originated. Consequently, drill cuttings reveal nothing about the material through which the drill bit is passing when the cuttings can be examined, nor can an examination of cuttings be used to predict what lies ahead of the drill bit.

Finally, the density of a subterranean area may be determined using measurements of the weight on the drill bit, the speed of rotation of the drill bit, and the penetration rate of the drill bit, as the drill bit passes through the area in question. However, the density cannot be calculated until after the drill bit has passed through the area.

SUMMARY OF THE INVENTION

The present invention is directed to a method and system for obtaining and utilizing seismic reflection and refraction data essentially continuously as a well bore is being drilled. A seismic pulse generator, or source, is located in the drill string just above the drill bit, and progresses with the bit down the well as the well is being drilled. Seismic detectors, or sensors, are arranged symmetrically on or near the ground surface in one or more circles, concentric about the well bore. In each circle, the sensors are uniformly spaced. At selected depths the source is triggered to emit seismic pulses which then propogate throughout the subterranean region surrounding the source in a generally spherical pattern. Portions of the generated pulses propogating downwardly are reflected at interfaces between geological layers, or structures, and travel up to the surface. Portions of the generated pulses propogating generally horizontally and upwardly are refracted by the material through which they pass, and also travel up to the surface. The surface detectors sense the refracted and reflected pulses and record them as data.

From an evaluation of the data, the pulse travel times above and below the drill bit can be accurately determined. When the measured travel times above the drill bit are correlated with the lithology penetrated by the bit, the lithology below the bit can be postulated and continuously corrected on the basis of the travel times that are recorded ahead of the bit. Furthermore, differences in the travel times to the symmetrically spaced sensors will reveal any significant deviations from a true vertical drilling path, after adjustments have been made for sensor elevations and structural variations. Such drilling direction information may be reduced for display on a cathode ray tube for substantially immediate use by the drilling crew. Continuous monitoring of amplitudes, frequencies polarities, and travel times of pulses near the drill bit will delineate lithologic changes immediately when they occur.

DESCRIPTION OF THE PREFERRED EMBODIMENT

Figure 1:
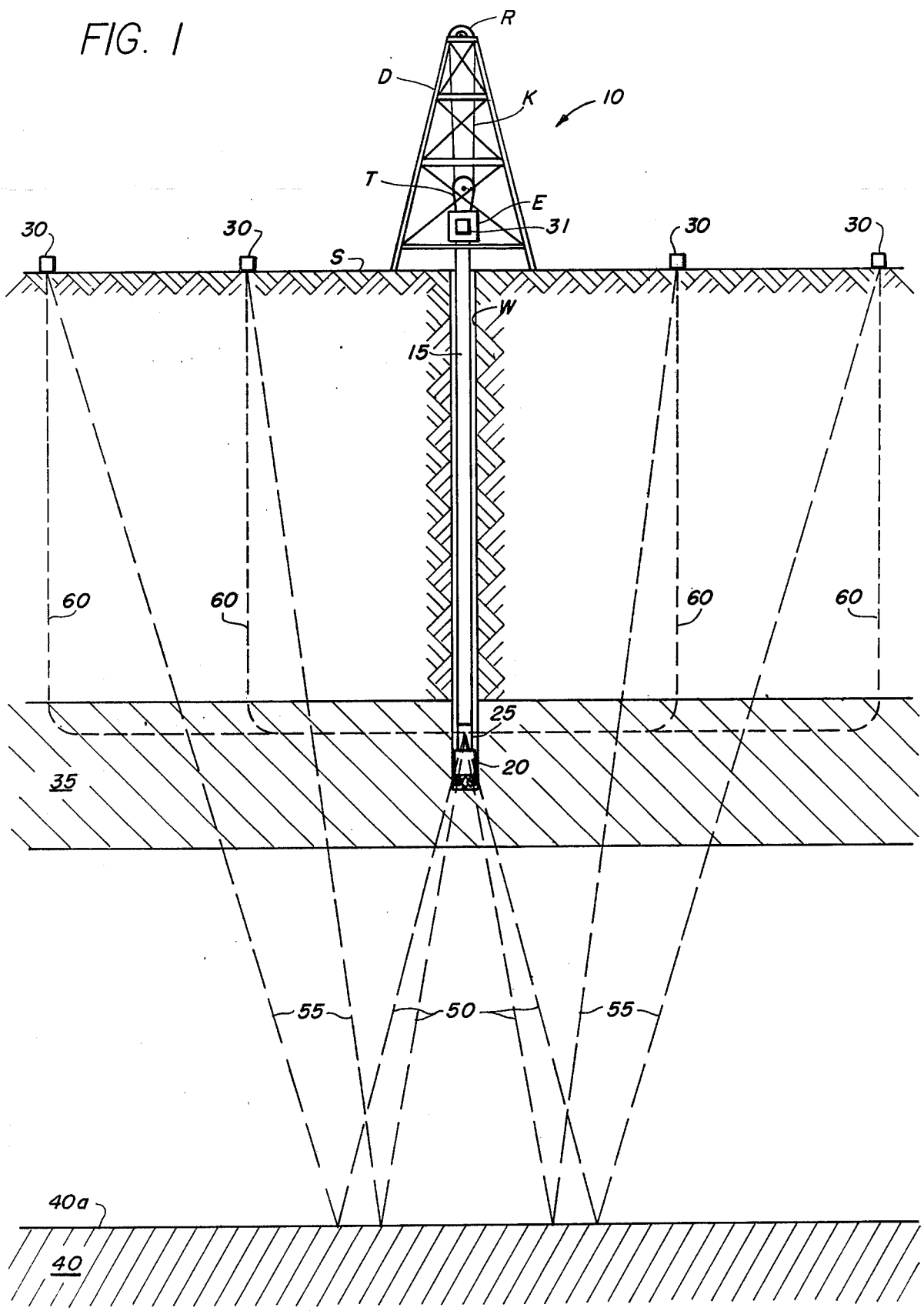
FIG. 1 is a schematic representation showing data being obtained by the method and system of the present invention.

FIG. 1 illustrates a typical data-gathering operation according to the method and system of the present invention. The usual well-drilling support equipment shown generally at 10 on the ground surface S includes a swivel E, supported by a traveling block T which is suspended by a cable K from a crown block R atop a derrick D. Other equipment required in a well-drilling operation but not relevant to the present invention is not shown.

A drill string 15 extends down below the ground surface S into the well bore W being drilled, and terminates in a drill bit 20. The drill string 15 comprises one or more drill pipe segments or joints, threadedly interconnected. As the drill bit 20 extends the well bore W deeper into the ground, additional drill pipe segments are added to the top of the drill string 15.

In the present invention, a seismic pulse generator, or source, 25 is placed at the lower end of the drill string 15, just above the drill bit 20. The source 25 may be of any design capable of producing a sonic pulse. The pulses may be produced, for example, by induced vibrations, implosions, explosions, or sudden injections of fluid against the wall of the well bore W, or by thumping the wall or the bottom of the well bore. An impact device such as a break-out jar will also produce a sonic pulse. Also, the mechanism used to trigger the source 25 may be of any suitable type, such as hydraulic, pneumatic, mechanical or electromagnetic, and may be controlled from the surface or operated automatically by a depth gauge or a sequence timer. Although some are not necessarily best suited for use with the present invention, U.S. Pat. Nos. 2,898,084; 3,221,833; and 3,702,635 disclose subterranean seismic pulse generators.

On the ground surface S, seismic detectors, or sensors, 30 are positioned in a pattern symmetric about the well bore W. In the elevation of FIG. 1, only four sensors are shown. A more detailed illustration of a typical sensor arrangement is given in the plan view of FIG. 2. There the position of the well bore W is indicated at the center of three concentric circles, A, B and C. The radii of the circles A, B and C may be 300 m, 600 m and 1200 m, respectively for example. Orthogonal radial lines XX' and YY', and orthogonal radial lines UU' and VV', set at 45° with respect to lines XX' and YY', are superimposed on the circles A, B and C. The intersections of the lines XX', YY', UU' and VV' with the circles A, B and C comprise a pattern of points characterized by rotational symmetry about an axis along the well bore W, and reflection symmetry with respect to any of the lines XX', YY', UU', and VV'. If a sensor is placed at each of the intersection points, the sensors on each circle will be uniformly spaced around the circle, and also the sensors on each radial line will be positioned on that line symmetrically with respect to the bore hole W.

Figure 2:
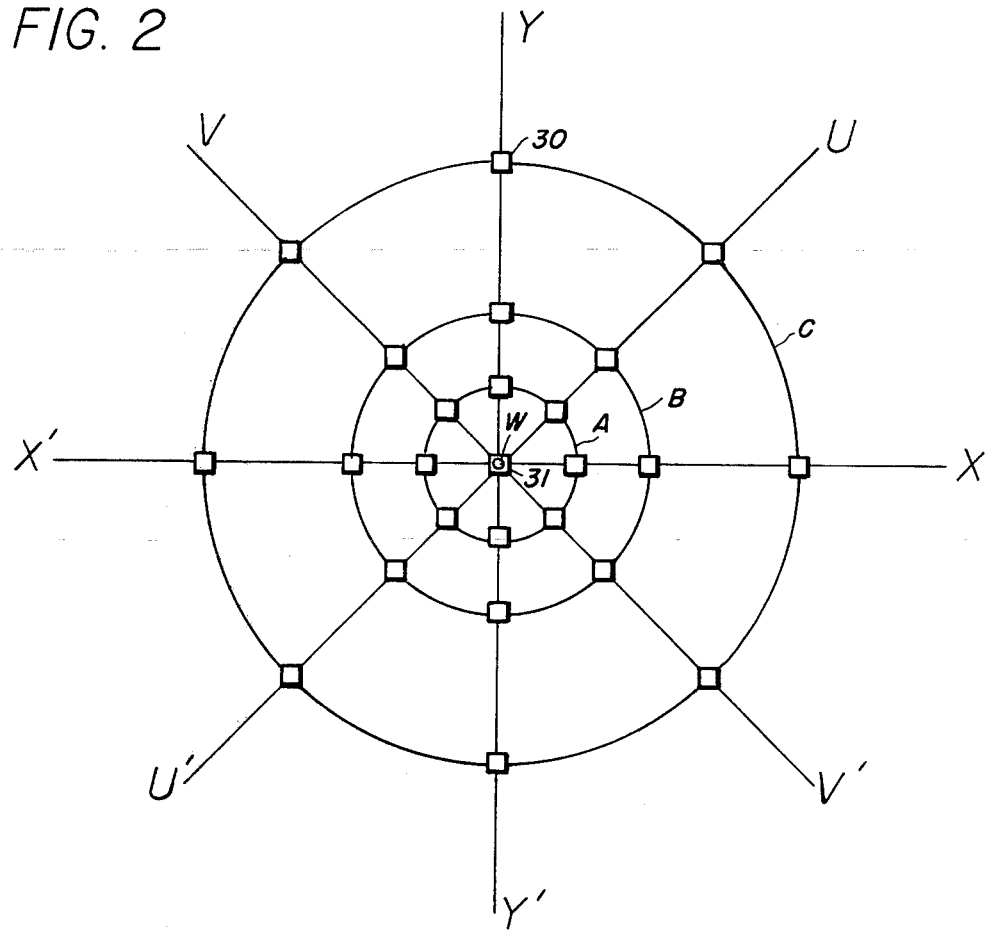
FIG. 2 is a plan view diagram of a typical arrangement of seismometers used in the system of the present invention.

A zero-point or reference sensor 31 may be located on the swivel E above the well bore W, as shown in FIG. 1, centered on the sensor pattern illustrated in FIG. 2. The zero-point sensor 31 is used to determine the pulse starting times as discussed hereinafter. All the sensors 30 and 31 are connected by appropriate electrical cable to central data collecting equipment (not shown).

In FIG. 1, the ray method is used to indicate some propogation paths of seismic pulses generated by the source 25. As illustrated, the source 25 and drill bit 20 are within a layer 35. Some distance below the layer 35 is a reflecting interface 40a marking the top of another distinct layer 40. Rays 50 indicate pulses traveling generally downwardly from the source 25 to the reflecting interface 40a at the lower layer 40. Reflected pulses then travel upwardly to the ground surface S where they are detected by the sensors 30, as indicated by rays 55. Rays 60 also indicate pulses propogating generally horizontally in the upper layer 35, and being refracted up and out of that layer 35. The refracted pulses also travel to the ground surface S to be detected by the sensors 30.

Figure 3:
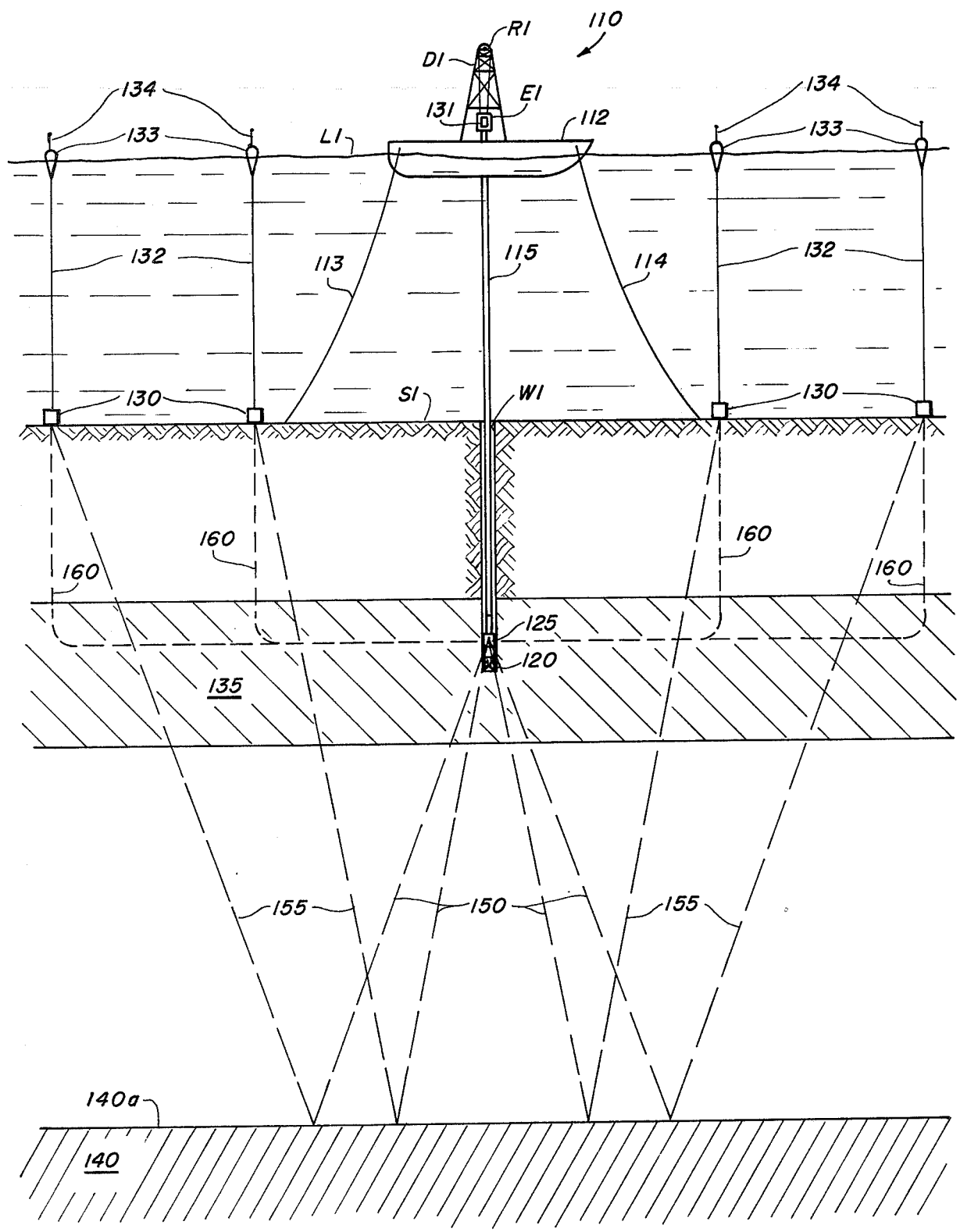
FIG. 3 is a schematic representation similar to FIG. 1, but showing data being gathered at an offshore location.

FIG. 3 illustrates a similar data-gathering operation at an offshore location. Elements in FIG. 3 similar to those shown in FIGS. 1 and 2 are similarly labelled. The well drilling support equipment shown generally at 110 is mounted on a drilling ship or platform 112 on the water surface L1, anchored by mooring lines 113 and 114. The support equipment 110 is shown to include a derrick D1 with a crown block R1 and swivel E1.

A drill string 115 extends downwardly through the water to the sea floor or ground surface S1, where the well bore W1 begins. The drill string 115 further extends downwardly through the well bore W1, and terminates in a drill bit 120 with a seismic source 125 mounted just above the bit. An array of sensors 130 is positioned at the ground surface S1, and zero-point sensor 131 is located on the swivel E1. While only four ground surface sensors 130 are shown in FIG. 3, they may be considered representative of a more complex array of sensors such as that shown in FIG. 2.

Each ground surface sensor 130 is connected by an electrical cable 132 to a radio-equipped buoy 133 floating on the water surface L1. An antenna 134 is part of appropriate radio equipment on each buoy 133. When a ground surface sensor 130 detects a seismic pulse, that information is converted into an electronic signal sent along the cable 132 to the radio in the connected buoy 133. The radio then relays the signal to appropriate receiving equipment (not shown) aboard the drill ship 112, where the signal is then passed to central data collecting equipment (not shown). A similar signal transmission arrangement is suggested in U.S. Pat. No. 3,817,345.

The drill bit 120 and source 125 are shown in an upper layer 135. A lower layer 140 is indicated with a reflecting interface 140a at its top. Rays 150 indicate pulses travelling generally downwardly from the source 125 to the reflecting interface 140a at the lower layer 140. There, pulses are reflected by the interface 140a, and travel upwardly to the ground surface S1, where they are detected by the sensors 130, as indicated by rays 155. Rays 160 indicate pulses propogating generally horizontally along the upper layer 135, and being refracted upwardly to the ground surface S1, to be detected there by the sensors 130.

Since the operation of gathering data offshore, as illustrated in FIG. 3, is essentially the same as the operation of gathering data at a land location, as illustrated in FIG. 1, with the exception that data signals are relayed from the ground surface sensors 130 to the central data collecting equipment via radio transmission in the former case, the operation of gathering data according to the method of the present invention will be described in terms of the land location operation in FIG. 1.

As the well bore W is being drilled, seismic pulses are periodically generated by the source 25, and detected by the sensors 30. Since the source 25 progresses down the well bore W with the drill bit 20, each time seismic data is thus acquired with the source at a greater depth than before, the paths travelled by the reflected and refracted pulses to the sensors 30 are different. As the depth of the generating source 25 increases, the path lengths of the refracted pulses increase, and the path lengths of pulses reflected at a given interface decrease. Also, seismic pulses refract through geological layers above the drill bit 20 without also reflecting off of those layers to the ground surface S while, when the source 25 and bit were previously located above such layers, pulses were reflected at those layers as well.

It will be appreciated that the rays 50, 55 and 60, and the geological layers 35 and 40 shown in FIG. 1 are only symbolic. Many different layers, or strata, may be present, oriented at different angles with respect to the horizontal, varying in thickness, and possessing uneven boundaries. Also, different pulses may reach the sensors 30 after reflections from many different interfaces, or after being refracted at many different depths. In particular, pulses travelling generally downwardly from the source 25 may be refracted along a layer such as the lower layer 40, and then refracted upwardly to the sensors 30. Also, each ground surface sensor 30 and 130 shown in FIGS. 1, 2 and 3 may be representative of more than one detector, arranged in an array generally at the location so indicated. Then, the signals from each such detector for a given pulse generated by the source 25 are combined to give a single output. This procedure may be followed to overcome the problems of interfering noises and weak signals often present in seismology operations, as is well known.

Seismic pulses may be generated by the source 25 at any level. When pulses are to be generated, normally the rotation of the drill string 15 must be halted. Therefore, it is convenient to obtain the seismic data whenever the drilling operation is temporarily halted to add a new segment of drill pipe to the drill string 15. Data may be taken at shorter intervals of drilling depth, for example, when the drill bit 20 is believed to be approaching a high pressure zone or other structure of particular interest.

When a pulse is generated by the source 25, in addition to the propogation of the pulse throughout the subterranean material, the pulse is transmitted up the drill string 25 to the swivel E and the sensor 31. It will be appreciated that the velocity of the pulse up the steel drill string 15 is approximately 6,000 m/sec. and it is relatively constant, while the seismic pulse velocity through subterranean material may vary from approximately 1,500 m/sec. in a fluid reservoir to approximately 6,000 m/sec. in a compact region, with an average of approximately 2,400 m/sec. in a typical environment. Furthermore, reflected and refracted pulses follow longer path lengths in reaching the ground surface sensors 30 than does the pulse traveling directly up the drill string 15 to the swivel sensor 31. Therefore, the drill string pulse reaches the swivel sensor 31 quickly enough after the pulse is generated by the source 25 compared to the time the reflected and refracted pulses take to reach the ground surface sensors 30 that the arrival of the drill string pulse at the swivel sensor may be used to calculate the starting time of the pulses generated by the source. This starting time serves as a zero-point reference when travel times of the pulses to the ground surface sensors 30 are measured as discussed hereinafter. Thus, the swivel sensor 31 is used as a zero-point sensor.

In a typical operation, three to ten pulses are generated each time data is taken. The signals detected at each sensor 30 and 31 from the multiple pulses is then summed into a single signal to cancel the effect of noise as discussed hereinafter. Approximately one minute is required to generate and observe six pulses. Consequently, essentially no delay in the drilling operation is required to obtain the data, and, therefore, data may readily be obtained at any rate, even "continuously", say every ten feet of drilled hole if desired.

It will be appreciated that sensor data recordings may be displayed in the form of graphs, or traces, of seismic disturbance as a function of time. Seismic disturbances which travel greater distances arrive at the sensors after the arrival of pulses travelling shorter distances. Therefore, as is well known in the art, such seismic traces may also be interpreted as functions of depth.

In the method of the present invention, the refracted pulses generally reach the ground surface sensors 30 before the reflected pulses. This feature is illustrated symbolically in FIG. 4 which shows traces from eight sensors 30 from, say, circle A of FIG. 2. The refraction trace disturbances may be caused by the pulses refracted by upper layer 35 as indicated by rays 60, in FIG. 1, and the reflection trace disturbances may be caused by the pulses reflected at the lower layer 40 as indicated by rays 55. Also, the refracted pulses normally travel shorter distances than do the reflected pulses, and arrive at the sensors 30 earlier, with greater move-out displacement and with higher amplitudes. Thus, the refracted pulses are distinguishable from the reflected pulses in the sensor traces, even though, in a particular case, the refracted and reflected pulse displacements on the traces overlap.

The seismic pulses generated by the source 25 and recorded at the sensors 30 and 31 may also be distinguishable from random noise, and from such coherent noise as that caused by the engines necessarily associated with the well drilling operation. It is well known that the frequency of a seismic disturbance reflected or refracted within the earth may vary from about 20 Hz below 6,000 m to about 100 Hz near the ground surface. The relatively low frequency range and the recognizable shapes of seismic pulses distinguish them from the predetermined high frequency noise of the engines, and from the erratic patterns generally found in random noise. To enhance the distinction between the seismic pulses and the noise, the multiple pulses generated at a single level by the source 25 are summed for each sensor recording as mentioned hereinbefore. Signals recorded with the source 25 at slightly different levels may also be summed for each sensor 30 and 31 to enhance the seismic pulse recording over the random noise. The sensors themselves may be designed to detect disturbances primarily in the seismic pulse frequency range, and limited to receive pulses traveling vertically or nearly so. Finally, when more than one detector 30 is used at each location of the pattern of FIG. 2, the detectors in each such group may be arranged so that the combination of signals from all the detectors at a single location effectively cancels horizontal surface waves and spurious noises.

The primary measurement made utilizing the data according to the present invention is the travel time of the refracted and reflected pulses arriving at the individual ground surface sensors 30. The time at which each pulse starts from the source 25 may be determined to within a few milliseconds or even microseconds. The zero-point sensor 31 may be used for this purpose as described hereinbefore. The arrival times of the pulses at the ground surface sensors 30 are noted precisely on the output data traces. With the spacing among the sensors 30, and between each sensor and the well bore W, known, and with the depth of the source 25 known from the length of the drill string 15, the velocities of the pulses detected at the various sensors may be readily determined.

Figure 5:
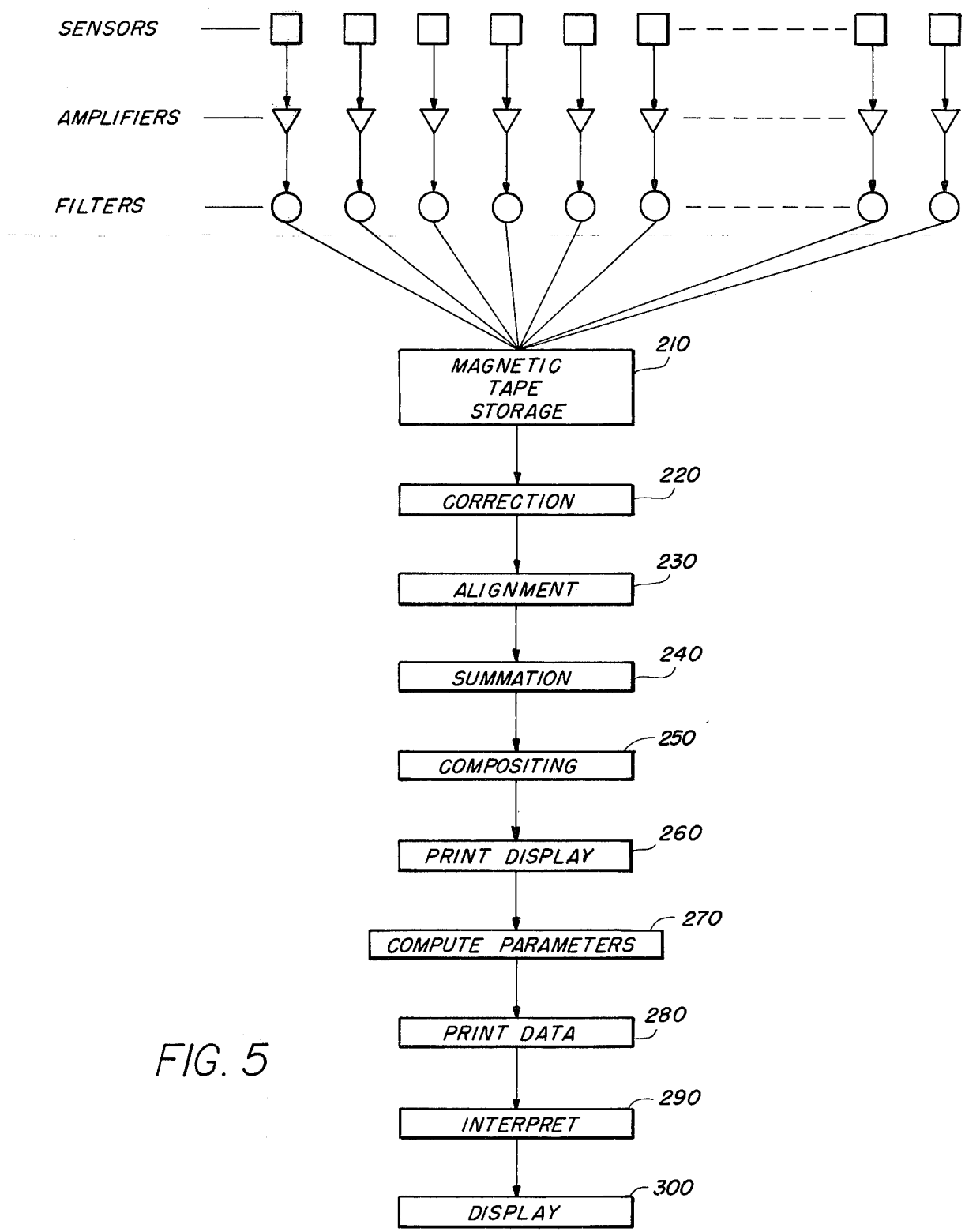
FIG. 5 is a diagram illustrating the steps to be followed in a typical application of utilizing data by the method of the present invention.

FIG. 5 shows the steps that may be followed in reducing the data in a typical application of the present invention. Seismic pulses are detected by the sensors, and converted into electronic signals which are then amplified. The amplified signals are fed into low pass filters to screen out the usually high frequency noise, both random and coherent as described hereinbefore. The signals are then stored on magnetic tape as indicated at 210 so that correction and enhancement techniques may be applied continuously.

The well known corrections to compensate for moveout and spherical divergence of the generated pulses may be applied next at 220. Any additional standard corrections, such as for variations in sensor elevation, may also be applied at this stage. The data traces are then aligned at 230 to have a common zero-point for the generation of the pulses detected.

At 240, the pulse signals may be summed according to one combination or another to overcome problems such as weak signals, or large background noise. A typical summation technique involved is to sum all the signals received by each ground surface sensor 30 for the multiple pulses generated by the source 25 at a given depth, as discussed hereinbefore.

Compositing at 250 includes all additional techniques that may be employed to enhance the seismic pulse data and cancel noise output on the data traces.

Finally, the corrected data traces may be displayed in graph form at 260. This operation may be performed by any appropriate method such as by manual plotting, by electronic or thermal recorder, or by an analog or digital computer coupled to a plotter or printer.

The display at 260 completes the basic steps in reducing the seismic data in a typical operation in preparation for utilization according to the present invention. The remaining operations are discussed hereinafter in conjunction with the application of the method to a particular type of data utilization.

Three kinds of information are made available by using the data obtained by the method of the present invention as discussed hereinbefore. First, with respect to refracted pulses only, differences in travel times to the symmetrically spaced ground surface sensors 30 reveal any significant deviations from a true vertical drilling path. With this information available to the drill crew, the direction of drilling may be immediately corrected. Also, where a change in drilling direction is desired, as in directional drilling at sea where several wells are drilled from one location, such a change may be introduced and monitored by observation of the variations in pulse travel times to the sensors 30.

It will be appreciated that, although ground surface sensors 30 are shown positioned in eight directions emanating from the well bore W in FIG. 2, only two such lines of sensors are needed to detect drill direction deviations from a single vertical plane, and only three such lines are needed to detect deviations from the true vertical in any direction.

In the data reduction scheme shown in FIG. 5, this problem in geometry is worked out at step 270, where the necessary parameters such as sensor 30 location, source 25 depth, and pulse velocity may be evaluated. A permanent printed record of the pulse travel times to the sensors 30 may be obtained at block 280, with the data appropriately grouped by sensor circles A, B, and C. These travel times may be interpreted at step 290 in terms of the deviation of the drilling direction from a true vertical. The interpretation itself may be a mere subjective evaluation of the printed display from step 280, or a more sophisticated operation done with the use of a computer and/or plotter or some other device. U.S. Pat. No. 2,062,151 and No. 3,817,345 disclose methods for determining the location of the bottom of a well hole relative to the top of the well hole using variations on the sensor arrangement disclosed hereinbefore, but, in the case of the former patent, detailing the type of algebraic calculations that could be used in the present case.

The display indicated at 300 may be a cathode ray tube (CRT) presentation available at the drill site within minutes of the pulse generation. Such a display might include a schematic plan view of the drilling operation with a polar coordinate system superimposed, with the surface position of the well-bore W located at the origin of the coordinate system. The travel time output is converted into signals placed on the X- and Y-deflection plates of the CRT. The exact horizontal location of the source 25, and therefore of the drill bit 20, for the depth at which the data has been obtained and reduced according to the scheme in FIG. 5 is then indicated by a bright spot on the screen of the CRT. The driller then has an instantaneous indication of the drilling direction with respect to the vertical, allowing him to immediately make any necessary corrections in the drilling path, or to appropriately change the drilling path to any desired slant.

Where there are geological structures that are not themselves symmetric around the well bore W, the effect of these structures on the pulse travel times must be canceled in evaluating drilling direction. Examples of such structures are a gravity fault, a reef, or a salt intrusion. These structures alter the speed of a seismic pulse passing through them. Where such structures lie only to one side of the well bore W, the travel times of pulses refracting through them to the ground sensors 30 above are altered, but the travel times of pulses not passing through such structures are not affected. The position and extent of such a structure may be determined by comparing these pulses to those acquired when the source 25 was located above the level of the structure. The existence and approximate shape of such a structure may also be determined by the effect it has on the pulse arrival times throughout the pattern of ground surface sensors 30. Once the existence of such a structure is identified, pulse velocity values can be corrected accordingly at step 220 in the data reduction scheme shown in FIG. 5 to evaluate the direction of drilling.

It may also be necessary, in a given case, to adjust the pulse travel time values in evaluating the drilling direction where the ground surface elevation varies throughout the pattern of ground surface sensors 30, as discussed hereinbefore in connection with step 220 in FIG. 5.

Another use for the data obtained according to the method described hereinbefore involves both refracted and reflected pulse travel times to look ahead of the drill bit 20. Basically, the reflected pulses are analyzed to determine geological structure below the drill bit 20, and the refracted pulse travel times above the drill bit are used to make continuous corrections on the information received from the reflected pulses.

Figure 4:
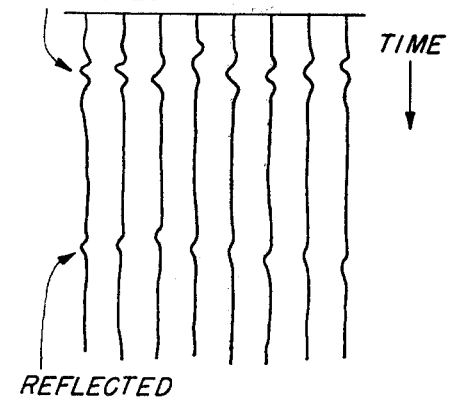
FIG. 4 is a symbolic representation of data traces from a circle of eight seismic sensors.

In a typical application, a detailed velocity analysis is made of the reflected pulses. Various methods of reducing data traces of the type shown in FIG. 4 are well known. In particular, interval velocity values may be obtained for pulses traveling between two reflecting interfaces. Perhaps the most direct way of obtaining such an interval velocity is to determine the travel time to the ground surface sensors 30 of pulses reflected at the interface at, say, the bottom of a geological layer, and to determine the like travel time of pulses reflected at the interface at the top of the same layer. The difference in these two travel times, divided into the thickness of the layer as determined from a seismological cross-section of the layer, yields the average velocity of a pulse through the layer, called the interval velocity. It is well known that the velocity of a seismic pulse is a function of the medium through which it is propogating, with the velocity ranging from about 300 m/sec in a pure gas to about 6,000 m/sec. in a brittle solid, with intermediate values in various mixes of gas, liquid and solid. Consequently, the interval velocity of a pulse within a geological layer may be used to identify the composition of that layer.

The data traces may also be examined to determine the amplitude, wave shape and polarity of pulses reflected at interfaces between layers. These three quantities can, along with the interval velocity, yield information concerning the density, the porosity and the pore pressure of a layer with respect to its environment.

Figure 6:
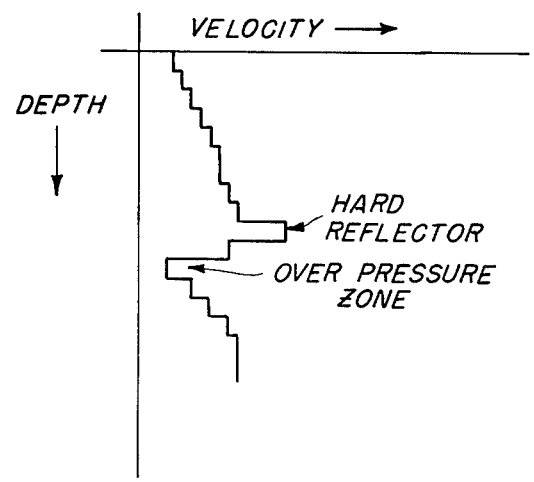
FIG. 6 is a sample graph of interval velocity as a function of depth obtainable from travel time measurements for pulses reflected from the tops and bottoms of structures.

FIG. 6 shows an interval velocity sample plot as a function of depth. The high velocity interval over the low velocity interval may, with the aid of amplitude, wave shape and polarity information, be interpreted as indicating the presence of a hard, highly compact, fluid-proof layer overlying a porous bed. Such a combination is known to be a possible trap for hydrocarbons under high pressure in the porous bed. Consequently, this type of information is important to have before the drill bit 20 pierces the hard upper layer so that preparation for a high pressure zone may be made in the drilling procedure, thus reducing the risks of hazardous blow-outs and possible damage to the environment.

Corrections to such reflection data may be made according to the method of the present invention as follows. The interval velocity in a layer above the drill bit 20 may be determined by measuring the travel times to the ground surface sensors 30 of pulses generated with the source 25 at the top of the layer, and pulses generated with the source 25 at the bottom of the layer. The difference in these travel time values is a measure of the pulse travel time through the intermediate layer. The interval pulse velocity in that layer can then be determined with knowledge of the layer thickness obtained from the known positions of the source 25 when located at the top and bottom of the layer. The top and bottom of the layer may be determined by lithologic interpretation of the refracted pulse signals as described hereinafter, and correlated with the lithologic interpretation of the same layer based on reflected pulse data, obtained when the drill bit 20 and source 25 were located above the layer, as discussed hereinbefore.

The travel time, or pulse velocity, in the layer above the drill bit 20, based on refracted pulse measurements, is compared to the previously obtained travel time, or velocity, values obtained by using pulses reflected off of the layer interfaces when the source 25 was above the layer. The refraction pulse travel times and the reflection pulse travel times are reduced separately in steps up to 280 in the scheme of FIG. 5. The comparison between the two sets of values is made at step 290. Any difference in these values then determines a correction factor at step 290 for the latest reflection data with respect to layers below the drill bit 20, since the travel times measured above the drill bit are generally more accurate than those measured below the drill bit. With the latest travel time or velocity data from pulses reflected at layers below the drill bit 20 altered by the correction factor, the lithology below the drill bit may be postulated. This new lithologic interpretation may also be corrected based on any differences in the lithologic interpretations of the layer currently above the drill bit 20 obtained from the refraction and reflection seismic data used to determine the correction factor for the travel times or velocities.

As drilling progresses, refraction and reflection data are thus continually taken above and below the drill bit 20 respectively. The refraction data is taken with respect to geological layers from which reflection data had previously been obtained, and for which lithologic interpretation had been made as described hereinbefore based on such reflection data. Identification of the lithology penetrated by the drill bit 20 is made based on the refraction data as described hereinafter. Then, at each step in the data-taking process, the refraction data is compared to the prior reflection data to obtain a correction factor, which is then used to correct the latest reflection data, and the predictions of lithology below the drill bit are refined. In this manner, seismic reflection and refraction data are used to look ahead of the drill bit 20, and continuous corrections can be made of interpretations of geological layers before the drill bit reaches them.

The third use of data acquired by the method and system of the present invention is to analyze the refracted pulse data to scan all around the drill bit. As noted hereinbefore the frequency, amplitude, polarity and velocity of a seismic disturbance are dependent on the nature of the medium through which the disturbance is propogating. Therefore, the lithologic changes experienced by the drill bit 20 during the drilling operation may be detected immediately by simply monitoring the refraction pulse data and correlating changes in these quantities to the position of the source 25 when the pulses are generated. Additionally, details of subterranean structures may be discerned and mapped based on analyses of such quantities in data from pulses refracted considerable distances laterally from the source 25. Such structures as salt domes, sand bodies, reefs and hydrocarbon traps, lying even 1,000 m from the source 25, may be identified and mapped in this way. This information is useful in making the corrections of the lithologic prediction ahead of the drill bit 20 as described hereinbefore.

The foregoing disclosure and description of the invention is illustrative and explanatory thereof, and various changes in the method steps as well as in the details of the illustrated methods and systems may be made within the scope of the appended claims without departing from the spirit of the invention.

I claim:

1. A method of obtaining and utilizing seismic data in drilling a well comprising the steps of:
   (a) providing seismic pulse generator means substantially adjacent drill bit means as said well is being drilled;
   (b) providing an array of seismic detection means, symmetric about said well, substantially at the starting level of said well;
   (c) generating discrete seismic pulses with said seismic pulse generator means at a selected depth in said well;
   (d) sensing a reflected and a refracted portion of said discrete seismic pulses with said seismic detection means, and converting said sensed reflected and refracted portions of said discrete seismic pulses into first recorded data;
   (e) reducing said first recorded data to obtain first reflection based interval velocity data from said discrete pulses reflected by subsurface structures below said selected depth; and
   (f) with said seismic pulse generator means at each of a plurality of subsequent selected depths in said well, further comprising the steps of:
      (i) generating discrete seismic pulses;
      (ii) sensing reflected and refracted portions of said generated discrete seismic pulses with said seismic detection means and converting said sensed reflected and refracted portions of said discrete seismic pulses into present recorded data;
      (iii) reducing said present recorded data to obtain present refraction based interval velocity data from portions of said discrete pulses refracted by subsurface structures at and above said present selected depth, and to obtain present reflection based interval velocity data from portions of said discrete pulses reflected by subsurface structures below said present selected depth;
      (iv) comparing said present refraction based interval velocity data with reflection based interval velocity data previously obtained, when said seismic pulse generator means was at previous higher selected depths, from portions of said discrete pulses reflected from said subsurface structures at and above said present selected depth;
      (v) determining correction factors for said previously obtained reflection based interval velocity data based on said comparing with said present refraction based interval velocity data;
      (vi) applying said correction factors to correct said present reflection based interval velocity data; and
      (vii) interpreting the subsurface structures at, above and below said present selected depth based on said present refraction based interval velocity data and said corrected present reflection based interval velocity data.

2. A method of obtaining and utilizing seismic data as defined in claim 1 in which said array of seismic detection means is arranged on one or more circles, concentric about said well, with said seismic detection means located at intersections of said circles with at least two radial lines emanating from the position of said well and rotationally symmetric about said well.

3. A method of obtaining and utilizing seismic data as defined in claim 2 in which zero-point seismic detection means is located substantially above said well to sense and record the beginning of said generated seismic pulses.

4. A method of obtaining and utilizing seismic data as defined in claim 1 further comprising:
   (a) interpreting said reduced recorded data from seismic pulses refracted above said seismic pulse generator means in terms of travel times of said refracted seismic pulses from said seismic pulse generator means to each of said seismic detection means; and
   (b) evaluating the position of said seismic pulse generator means in relation to said well at said starting level of said well.

5. A method of obtaining and utilizing seismic data as defined in claim 4 in which said array of seismic detection means is arranged on one or more circles, concentric about said well, with said seismic detection means located at the intersections of said circles with at least two radial lines emanating from the position of said well and rotationally symmetric about said well.

6. A method of obtaining and utilizing seismic data as defined in claim 5 in which zero-point seismic detection means is located substantially above said well to sense and record the beginning of said generated seismic pulses.

7. A method of obtaining and utilizing seismic data as defined in claim 1, with said seismic pulse generator means at any selected depth, further comprising the steps of:
   (a) generating discrete seismic pulses with said seismic pulse generator means;
   (b) sensing said generated discrete seismic pulses with said seismic detection means, and converting said sensed seismic pulses into recorded data;
   (c) reducing said recorded data to obtain refracted discrete seismic pulse travel time data;
   (d) processing said refracted seismic pulse travel time data to obtain a first signal carrying information about the position of said seismic pulse generator means along a first substantially horizontal direction with respect to substantially the location of the well starting position at the surface level, and a second signal carrying information about the position of said seismic pulse generator means along a second substantially horizontal direction with respect to substantially the location of the well starting position at the surface level, said first and second substantially horizontal directions being mutually orthogonal; and (e) applying said first signal and said second signal to visual display means, and thereby indicating the substantially horizontal position of said seismic pulse generator means relative to a fiducial mark representing substantially the location of said well starting position at the surface level.

8. A method of obtaining and utilizing seismic data as defined in claim 7 in which said array of seismic detection means is arranged on one or more circles, concentric about said well, with said seismic detection means located at intersections of said circles with at least two radial lines emanating from the position of said well and rotationally symmetric about said well.

9. A method of obtaining and utilizing seismic data as defined in claim 8 in which zero-point seismic detection means is located substantially above said well to sense and record the beginning of said generated discrete seismic pulses.

10. A method of obtaining and utilizing seismic data as defined in claim 7 further comprising the steps of:
(a) applying said first signal to vertical input of cathode ray tube means;
(b) applying said second signal to horizontal input of said cathode ray tube means; and
(c) indicating the substantially horizontal position of said seismic pulse generator means relative to substantially the location of said well starting position at the surface level by the relative position of trace means of said cathode ray tube means with respect to said fiducial mark.

11. A method of obtaining and utilizing seismic data as defined in claim 7 further comprising the steps of:
(a) evaluating said refracted seismic pulse travel time data with respect to degree of asymmetry of values of said data with respect to said well to determine any asymmetry, with respect to said well, of subsurface structures located above said seismic pulse generator means;
(b) determining correction factors for said refracted seismic pulse travel time data based on said evaluating; and
(c) applying said correction factors to said refracted seismic pulse travel time data before said processing to obtain first signal and said second signal.

12. A system for obtaining seismic data in drilling a well comprising in combination with well drilling equipment:
(a) seismic discrete pulse generator means substantially adjacent the drill bit of said drilling equipment, for descending into said well with said drill bit as said well is being drilled;
(b) an array of seismic discrete pulse detection means substantially at the surface level of said well, arranged in a pattern of intersections of circles concentric about said well with radial lines emanating from said well, and rotationally symmetric about said well;
(c) data recording and reduction means for evaluating data from discrete seismic pulses refracted to said seismic pulse detection means, and data from seismic pulses reflected to said seismic pulse detection means, and for obtaining refracted discrete seismic pulse travel time data;
(d) first data processing means for combining said refracted discrete seismic pulse travel time data obtained from said array of seismic detection means to produce a first signal carrying information about the position of said seismic pulse generator means along a first substantially horizontal direction with respect to substantially the location of the well starting position at the surface level, and a second signal carrying information about the position of said discrete seismic pulse generator means along a second substantially horizontal direction with respect to substantially the location of the well starting position at the surface level, said first and second substantially horizontal directions being mutually orthogonal; and
(e) visual display means, for receiving said first signal and said second signal, and for indicating the substantially horizontal position of said discrete seismic pulse generator means relative to a fiducial mark representing substantially the location of said well starting position at the surface level.

13. A system for obtaining seismic data as defined in claim 12 further comprising zero-point seismic detection means located substantially above said well to sense and record the beginning of said seismic pulses generated by said seismic pulse generator means and defining the position of said fiducial mark.

14. A system for obtaining seismic data as defined in claim 12 wherein said reduction means further comprises:
(a) refracted pulse frequency, amplitude, polarity, and velocity monitoring means; and
(b) correlation means for correlating said refracted pulse frequencies, amplitudes, polarities, and velocities to drill bit depth.

15. A system for obtaining seismic data as defined in claim 12 wherein said reduction means further comprises correlation means for comparing refracted pulse data with reflected pulse data and correcting reflected pulse data evaluations thereby.

16. A system for obtaining seismic refraction data as defined in claim 12 wherein:
(a) said visual display means comprises a cathode ray tube;
(b) said first signal is applied to vertical input of said cathode ray tube;
(c) said second signal is applied to horizontal input of said cathode ray tube; and
(d) said substantially horizontal position of said seismic pulse generator means relative to substantially the location of said well starting position at the surface level is indicated by the relative position of trace means of said cathode ray tube means with respect to said fiducial mark.

17. A system for obtaining seismic data as defined in claim 16 further comprising zero-point seismic detection means located substantially above said well to sense and record the beginning of said seismic pulses generated by said seismic pulse generator means.

18. A system for obtaining seismic data as defined in claim 12 further comprising:
(a) means for comparing refracted discrete seismic pulse travel time data acquired with said seismic discrete pulse generator means at a first selected depth with refracted discrete seismic pulse travel time data acquired with said discrete seismic pulse generator means at a second selected depth, lower than said first selected depth, to determine any asymmetry, with respect to said well, of subsurface structures located between said first selected depth and said second selected depth;

(b) means for determining correction factors for said refracted discrete seismic pulse travel time data acquired with said discrete seismic pulse generator means at said second selected depth based on said comparing; and
(c) means for applying said correction factors to said refracted discrete seismic pulse travel time data acquired with said discrete seismic pulse generator means at said second selected depth before said combining to produce said first signal and said second signal.

19. A system for obtaining seismic data as defined in claim 12 further comprising:
(a) means for evaluating said refracted discrete seismic pulse travel time data with respect to degree of asymmetry of values of said data with respect to said well to determine any asymmetry, with respect to said well, of subsurface structures located above said seismic pulse generator means;
(b) means for determining correction factors for said refracted discrete seismic pulse travel time data based on said evaluating; and
(c) means for applying said correction factors to said refracted discrete seismic pulse travel time data before said combining to produce said first signal and said second signal.

20. A system for obtaining seismic data as defined in claim 12 further comprising:
(a) second data processing means for comparing said refracted discrete pulse data from seismic pulses refracted by subsurface structures above said discrete seismic pulse generator means with said reflected discrete pulse data from discrete seismic pulses previously reflected by said subsurface structures when said seismic generator means was located above said subsurface structures, and for determining correction factors for said previously obtained reflected discrete seismic pulse data based on said comparing; and
(b) means for applying said correction factors to reflected pulse data from discrete seismic pulses reflected by subsurface structures below said discrete seismic pulse generator.

* * * * *